US007860196B2

(12) United States Patent
Cheah et al.

(10) Patent No.: US 7,860,196 B2
(45) Date of Patent: Dec. 28, 2010

(54) METHOD AND CIRCUIT FOR ESTIMATING IN-PHASE/QUADRATURE SIGNAL AMPLITUDE IMBALANCE

(75) Inventors: Chow Loong Cheah, Sungai Petani (MY); Siew Yin Lee, Bayan Lepas (MY); Vc Prakash Vk Chacko, Gelugor (MY)

(73) Assignee: Motorola, Inc., Schaumburg, IL (US)

( * ) Notice: Subject to any disclaimer, the term of this patent is extended or adjusted under 35 U.S.C. 154(b) by 921 days.

(21) Appl. No.: 11/621,735

(22) Filed: Jan. 10, 2007

(65) Prior Publication Data

US 2008/0166978 A1 Jul. 10, 2008

(51) Int. Cl.
*H04L 27/06* (2006.01)
*H04B 1/40* (2006.01)
(52) U.S. Cl. ........................................ 375/344; 455/75
(58) Field of Classification Search ................. 375/316, 375/344; 455/75, 323
See application file for complete search history.

(56) References Cited

U.S. PATENT DOCUMENTS 5,068,614 A * 11/1991 Fields et al. ................ 324/534
5,584,062 A * 12/1996 Meador et al. .............. 455/260
2003/0202571 A1   10/2003 Kearney
2004/0106380 A1 *  6/2004 Vassiliou et al. .............. 455/73

FOREIGN PATENT DOCUMENTS

KR   1020040036492 A   4/2004

* cited by examiner

*Primary Examiner*—David C Payne
*Assistant Examiner*—Brian J Stevens
(74) *Attorney, Agent, or Firm*—Terri S. Hughes; Anthony P. Curtis

(57) ABSTRACT

A method and circuit are described for estimating I and Q amplitude imbalance occurring in a signal received by a direct conversion receiver (DCR). The DCR generates a mixing signal having a frequency substantially the same as the carrier signal of the signal received by an antenna. A mixing module mixes the mixing signal at different phases with the received signal to generate I and Q baseband signals. A frequency offset circuit generates an offset signal having a frequency offset from the carrier signal frequency. A coupling circuit selectively decouples the antenna from the DCR and couples the offset signal to the mixing module to generate a baseband test signal in the I and Q signal paths for determining an imbalance in the amplitudes of the baseband test signals between the I and Q signal paths.

20 Claims, 4 Drawing Sheets

METHOD AND CIRCUIT FOR ESTIMATING IN-PHASE/QUADRATURE SIGNAL AMPLITUDE IMBALANCE

TECHNICAL FIELD

This invention relates in general, to a method and circuit for estimating an in-phase (I) and quadrature phase (Q) amplitude imbalance occurring in a signal received by a direct conversion receiver of the circuit.

BACKGROUND

Communication systems utilizing radio frequency (RF) signals often convert the received signal into an in-phase (I) component and a quadrature (Q) component. A mismatch in the electrical components in these signal channels causes I/Q amplitude and phase imbalances in the received signal. I/Q imbalance algorithms implemented within the digital processing parts of a receiver can be used to estimate these amplitude and phase imbalances, however, they rely for their accuracy on a strong static received carrier signal. Under weak carrier signal reception, the accuracy of these I/Q imbalance estimates is reduced because of the presence of increased noise in the I/Q data. This noise leads to errors in the I/Q imbalance estimations and hence the correction applied to the received signal, and this is especially pronounced where the signal is converted into its constituent baseband I/Q components such as in direct conversion receivers; for example, in analog frequency modulation (FM) transceivers.

Furthermore, because the carrier signal used to estimate the I/Q imbalance needs to be static, the overall communications system of transmitters and receivers requires a scan mode which reduces the traffic bandwidth of the system and requires complicated control systems to coordinate these periodic scan modes.

BRIEF DESCRIPTION OF THE DRAWINGS

The present invention is illustrated by way of example and not limitation in the accompanying figures, in which like references indicate similar elements, and in which.

Figure 1:
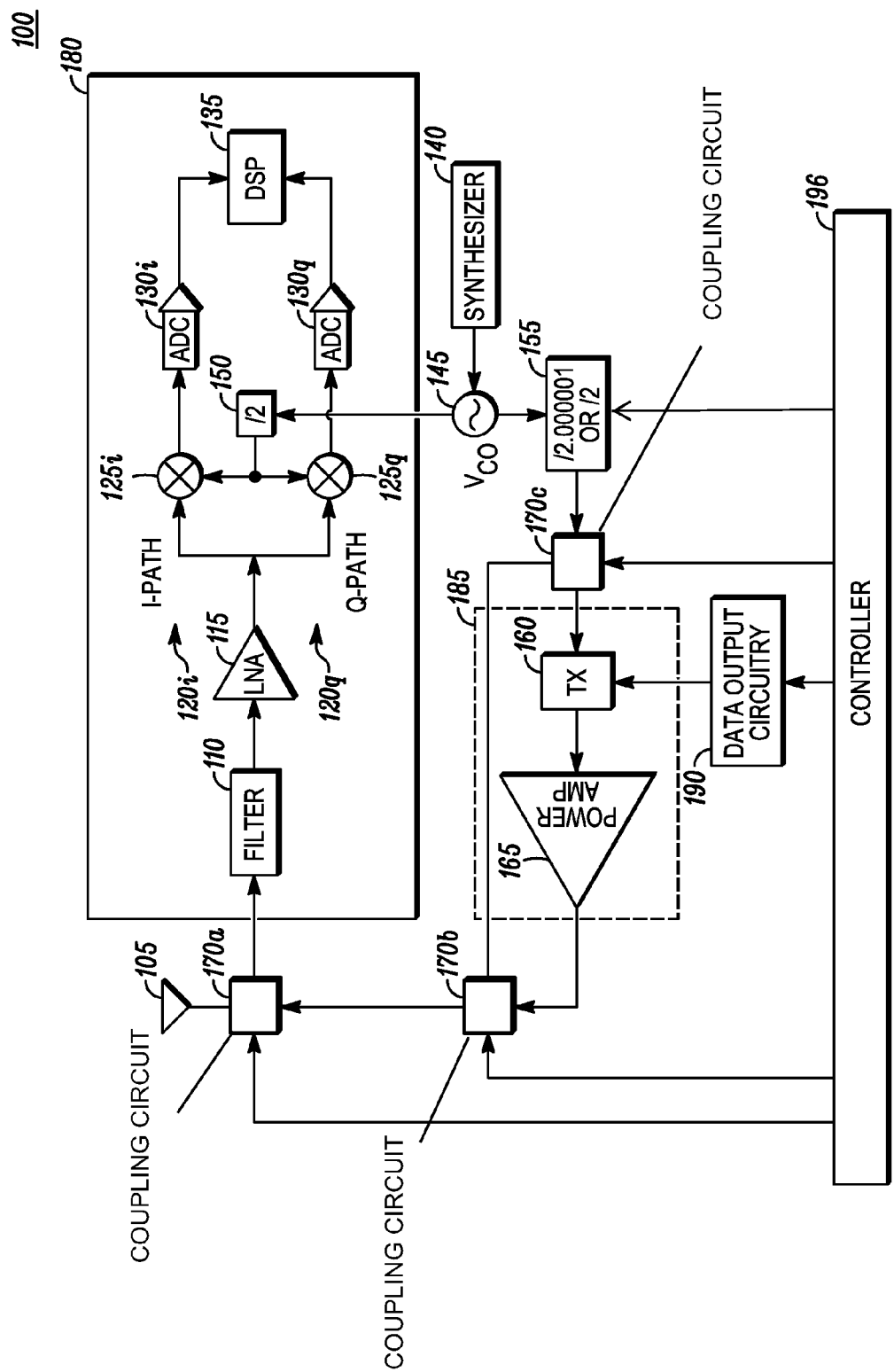
FIG. 1 is a schematic diagram illustrating part of a two-way radio circuit that includes a direct conversion receiver according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE EMBODIMENTS

Briefly, in accordance with the present invention there is disclosed herein circuitry and a method for estimating and correcting in-phase (I) and quadrature phase (Q) baseband signal amplitude imbalance in the in-phase and quadrature phase signal paths of a direct conversion receiver for receiving a carrier signal modulated by a data signal. The method comprises the steps of generating an offset signal having a frequency offset from the frequency of the carrier signal. This may be implemented using a frequency offset circuit comprising a programmable frequency divider having a fractional division ratio and which is coupled to a local oscillator which generates a local oscillator signal having the same frequency as the carrier signal, or a multiple of this frequency. The method applies the offset signal to the direct conversion receiver, for example, by switching a switching matrix or other coupling circuit. The method also generates a mixing signal having a frequency substantially the same as the carrier signal. This may be implemented using a frequency divider having a whole number division ratio coupled to the local oscillator. The method further comprises mixing the offset signal with the mixing signal in a mixing module of the in-phase and quadrature signal paths in order to generate a baseband test signal in each of the in-phase and quadrature signal paths, and measuring the amplitudes of the baseband test signals in the in-phase and quadrature signal paths in order to determine any imbalance between the amplitudes of the baseband test signals in the in-phase and quadrature signal paths. A correction factor can be determined from the differences in the amplitudes of the I and Q baseband test signals, and this correction factor can be applied to subsequently received baseband signals generated from the received carrier signal modulated by the data signal.

Before describing in detail a particular method and circuit for I/Q imbalance estimation and/or correction in accordance with one or more embodiments of the present invention, it should be observed that the present invention resides primarily in combinations of method steps and receiver components related to a method and a circuit for baseband I/Q signal imbalance estimation and/or correction. Accordingly, the circuit components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

A "set" as used in this document, means a non-empty set (i.e., comprising at least one member). The term "another", as used herein, is defined as at least a second or more. The terms "including" and/or "having", as used herein, are defined as comprising.

It is further understood that the use of relational terms, if any, such as first and second, top and bottom, and the like, are used solely to distinguish one entity or action from another, without necessarily requiring or implying any actual relationship or order between such entities or actions.

FIG. 1 is a schematic diagram illustrating part of a two-way radio circuit 100 that includes a direct conversion receiver 180 such as a frequency modulation (FM) receiver. The two-way radio circuit 100 comprises an antenna 105 selectively coupled to the direct conversion receiver 180. The direct conversion receiver comprises a filter 110 coupled to a low noise amplifier (LNA) 115. The output from the LNA 115 is coupled to an in-phase (J) signal path generally indicated by reference number 120$i$, and a quadrature phase (Q) signal path generally indicated by reference number 120$q$. Each of the in-phase (J) and quadrature phase (Q) signals paths 120$i$ and 120$q$ comprise a mixer 125$i$ and 125$q$ respectively. Each mixer 125$i$, 125$q$ is coupled to a respective analog-to-digital converter (ADC) 130i and 130q, which are coupled to respective in-phase (I) and quadrature phase (Q) inputs of a digital signal processing block 135.

In receive mode of the two-way radio circuit 100, the direct conversion receiver 180 receives a carrier signal modulated by a data signal when coupled to the antenna 105. The two mixers 125i, 125q form a mixing module in which a mixing signal is mixed at different phases (typically 90 degrees) in the I and Q signal paths with the signal received by the direct conversion receiver 180 from the antenna 105. This mixing generates in-phase (I) and quadrature phase (Q) baseband signals. As is known, in direct conversion receivers the mixing signal will have the same frequency as the received carrier signal, and the generated baseband signal will be dependent on a data signal which modulates the received carrier signal.

The two-way radio circuit 100 also comprises a signal generator circuit having a synthesizer 140 and voltage controlled oscillator (VCO) 145 which generates a local oscillator signal (Lo). The output of the VCO 145 is coupled to a mixer frequency divider 150 (a first frequency divider) which divides the local oscillator signal (Lo) by two (2) to generate the mixing signal which is supplied to each of the two mixers 125i and 125q. The output of the VCO 145 is also coupled to a programmable frequency divider 155 which divides the local oscillator signal (Lo) by a programmable amount depending on the mode of the two-way radio circuit 100. In this embodiment, the programmable frequency divider 155 in a transmission mode divides the local oscillator signal (Lo) by two (2) in order to generate a transmission carrier signal having the same frequency as the mixing signal and the received carrier signal. In a test mode, the programmable frequency divider 155 divides the local oscillator signal (Lo) by a fractionally different number (e.g., 2.00001) in order to generate an offset signal having a frequency that is offset from the frequency of the mixing signal. In this test mode, the programmable frequency divider 155 receiving the local oscillator signal (Lo) and having a fractional division ratio (e.g., 2.0001) forms a frequency offset circuit arranged to generate the offset signal.

In an alternative arrangement, the frequency offset circuit may be implemented using a dedicated frequency divider having a fixed (e.g., fractional 2.0001) division ratio, and which is arranged to generate an offset signal having a frequency offset from the frequency of the carrier signal. This may even use a separate oscillator from the signal generator circuit (140, 145, 150) and/or the oscillator used for generating the transmission carrier signal. In arrangements having a dedicated frequency divider for the frequency offset circuit, the transmission carrier signal may be generated by a separate frequency divider (not shown) having the same division ratio as the mixing frequency divider 150 and also coupled to the local oscillator 145.

The two-way radio circuit 100 also comprises a transmitter 185, which in this embodiment, comprises a transmission circuit block 160 that has an input selectively coupled to the output of the programmable frequency divider 155 and an output of the transmission circuit block 160 is coupled to an input of a power amplifier 165. The output of the power amplifier 165 is selectively coupled to the antenna 105. The transmission circuit block 160 generates a signal which is used to modulate the transmission carrier signal generated by the second frequency divider 155 (in divide by 2 or transmission mode).

The two-way radio circuit 100 also comprises a coupling circuit which includes a number of switches 170a, 170b, 170c that are controllable to selectively couple the antenna 105 to the input of the direct conversion receiver 180, or the output of the power amplifier 165 (transmitter 185); or the output of the programmable frequency divider 155 to the input of the direct conversion receiver 180. A first switch 170a of the coupling circuit is controllable and arranged to selectively couple the antenna 105 to the input of the direct conversion receiver 180, or to a second switch 170b. The second switch 170b is controllable and arranged with the first switch 170a to selectively couple the antenna 105 to the output of the transmitter 185 (specifically the output of the power amplifier 165). The second switch 170b is also controllable and arranged with the first switch 170a to selectively couple the input of the direct conversion receiver 180 to the third switch 170c. Further, the third switch 170c is also controllable and arranged with the first switch 170a and second switch 170c to selectively couple the output of the programmable frequency divider 155 to the modulator input of the transmitter 185 (specifically the modulator input of the transmission circuit block 160) or to the input of the direct conversion receiver 180.

The two-way radio circuit 100 also includes a data output circuitry 190 having an output coupled to a data input of transmitter 185 (specifically the transmission circuit block 160). The data output circuitry 190 generates a transmission data signal which in transmission mode is modulated in the transmission circuit block 160 with the transmission carrier signal from the programmable frequency divider 155 in order to generate a transmission output signal. There is also a controller 196 that is coupled to control the data output circuitry 190 and the switches 170a, 170b, 170c of the coupling circuit.

When the two-way radio circuit 100 is operating in receiver mode, the first switch 170a of the coupling circuit is arranged to couple the antenna 105 and the direct conversion receiver 180. The filter 110 and LNA 115 receive a data signal modulated by a carrier signal from the antenna 105. Other received signals are filtered out by the filter 110, and the resulting data signal modulated by the carrier signal is amplified by the LNA 115. The filtered and amplified data signal modulated by the carrier signal is then split into the in-phase (I) and quadrature phase (Q) signal paths, 120i and 120q respectively. The data signal modulated by the carrier signal is then mixed in the mixing module by the respective mixers 125i and 125q with the mixing signal, but at different phases—typically ninety degrees apart. The mixing signal has a frequency which is substantially the same as the frequency of the carrier signal. This mixing generates a baseband signal comprising the data signal in each of the in-phase and quadrature phase signal paths 120i and 120q as is known. These respective in-phase (I) and quadrature phase (Q) baseband signals are then digitized by the respective ADC 130i and 130q. The digitized in-phase and quadrature phase baseband signals are then input into respective in-phase and quadrature inputs of a DSP block for further processing as is known.

A mismatch of circuit components used in the mixers, ADC or other parts such as additional baseband filters (not shown) of the in-phase and quadrature phase signal paths 120i and 120q will result in differences in the amplitude of the baseband signals input into the DSP 135 from the in-phase and quadrature phase signal paths 120i and 120q. This can cause subsequent errors within the DSP 135 in further processing the received data signal.

When the two-way radio circuit 100 is operating in transmitter mode, first and second switches 170a and 170b are switched to connect the output of the power amplifier 165 to the antenna 105. The programmable frequency divider 155 is programmed to divide the local oscillator signal (Lo) from the VCO 145 by two, or the same division ratio as the mixer frequency divider 150. This generates a transmission carrier signal having the same frequency as the received carrier signal and is modulated by an output signal from the signal output circuitry 190 to generate a transmission signal. The third switch 170c is switched to connect the output of the programmable frequency divider 155 to the transmitter circuit block 160. The transmission signal is amplified by the power amplifier 165 and transmitted by the antenna 105.

When the two-way radio circuit 100 is operating in test mode, the first switch 170a, second switch 170b, and third switch 170c are switched to connect the programmable frequency divider 155 to the direct conversion receiver 180. The power amplifier 165 of the transmitter 185 is isolated from the direct conversion receiver 180 by the coupling circuit 170a-170c, and the receiver direct conversion 180 is also isolated from the antenna 105 by the coupling circuit 170a-170c. The programmable frequency divider 155 is programmed to divide the local oscillator signal (Lo) from the VCO 145 by a fractional ratio in order to generate the offset signal. In this embodiment, the fractional division ratio is 2.000001, which is slightly different from the division ratio (2) used by the mixer frequency divider 150. By adjusting the local oscillator signal in this way, the offset signal has a frequency offset from the frequency of the carrier signal. The third switch 170c is switched to connect the offset signal from the programmable frequency divider 155 to the second switch 170b. The second switch 170b is switched to connect the first switch 170a to the programmable frequency divider 155, and the first switch 170a is switched to connect the direct conversion receiver 180 to the programmable frequency divider 155. Thus, the offset signal is applied or input to the direct conversion receiver 180 of the two-way radio circuit 100. The offset signal passes through the filter 110 as its frequency is offset only by a small amount from the frequency of the carrier signal which the filter is designed to pass. Thus, the amount of frequency offset is sufficient to fall within the frequency cut-off values of the filter 110. The offset signal is amplified by the LNA 115, and output into the in-phase (I) and quadrature phase (Q) signal paths 120i and 120q.

The mixers 125i and 125q mix the received offset signal with the mixing signal at different phases. Because the carrier signal is normally modulated by the data signal using frequency modulation, small changes in frequency of the carrier signal are used to generate the baseband signals associated with the modulating data signal as is known. Therefore, the offset signal, having a small change in frequency compared with the carrier signal, generates a constant or static baseband test signal in each of the I and Q signal paths 120i and 120q. These baseband test signals should have the same amplitude as they are generated by the same change or deviation in the carrier signal frequency which remains constant throughout the test mode. Therefore, in an ideal situation there should be no difference in the amplitude signal in the I and Q signal paths 120i and 120q and there should be an exact 90 degree phase offset of the baseband test signal measured in the I and Q signal paths 120i and 120q. However, as mentioned previously, because of component mismatches in the I and Q signal path circuitry, in practice there may be some difference in baseband signal amplitude and phase even when the same test or offset signal is used. By measuring the amplitude and phase of the baseband test signals, any I/Q imbalances can be determined, and an appropriate correction factor applied to subsequent baseband signals received in the receiver mode.

The baseband test signal amplitudes will typically be measured by the DSP block 135 following digitization by the ADC 130i and 130q. Correcting for I/Q amplitude imbalance may be achieved using a suitable algorithm within the DSP block 135. This might determine the voltage amplitude (Vi) of an in-phase (I) baseband test signal sample; and determine the voltage amplitude (Vq) of a quadrature phase (Q) baseband test signal sample. The amplitude and phase imbalance are calculated with the equations as shown below.

$$\hat{A}(\text{Amplitude Imbalance}) = \frac{|Vq(t)|}{|Vi(t)|} = \sqrt{\frac{\frac{1}{T}\int_0^T (Vq^2(t))dt}{\frac{1}{T}\int_0^T (Vi^2(t))dt}}$$

$$\hat{\alpha}(\text{Phase Imbalance}) = \sin^{-1}\left(\frac{\frac{1}{T}\int_0^T Vi(t)*Vq(t)dt}{\sqrt{\frac{1}{T}\int_0^T Vi^2(t)*Vq^2(t)dt}}\right)$$

The corrected I and Q is obtained by multiplying the imbalance as shown below $$I_c(t)=Vi(t)*\hat{A}*\cos(\hat{\alpha})$$

$$Q_c(t)=Vq(t)-Vi(t)*\hat{A}*\sin(\hat{\alpha})$$

The amount of frequency offset of the offset signal will determine the amplitude of the baseband test signals. However, the frequency of the offset signal will be within the pass-band of the filter 110 in order to provide a signal to the input of the mixers 125i and 125q. In this context, within the pass-band of the filter simply means that the output of the filter should be of sufficient amplitude to enable the mixers to generate a baseband test signal.

In an example implementation, the VCO frequency (Lo) is 810 MHz and the mixing signal frequency is 405 MHz. For a divider ratio of 2.000001, the offset signal has a frequency of 404.9999798 MHz. This is a frequency offset of 202.5 Hz which is sufficient to generate baseband test signals that can be used by the DSP 135 to determine an I/Q imbalance.

It can be seen therefore that the embodiment provides a simple, cost-effective mechanism for determining and correcting for imbalances in in-phase and quadrature phase baseband amplitudes due to circuit component mismatching. The only modification to many existing direct conversion transceivers will be a modification to their control software to implement the test mode, a suitable switching matrix to implement the coupling circuit, and a modified frequency divider to implement the frequency offset circuit. This arrangement does not require the handling of a scan mode requiring the reception of special test broadcasts having constant modulation to calibrate the I and Q signal paths. This arrangement also does not need to rely on DSP based I/Q imbalance estimation techniques which are susceptible to error especially in weak carrier signal reception environments. Another advantage of the present invention is that there is a faster correction since the dependency on an external received signal is not necessarily required in order to determine imbalances in in-phase and quadrature phase baseband amplitudes.

Figure 2:
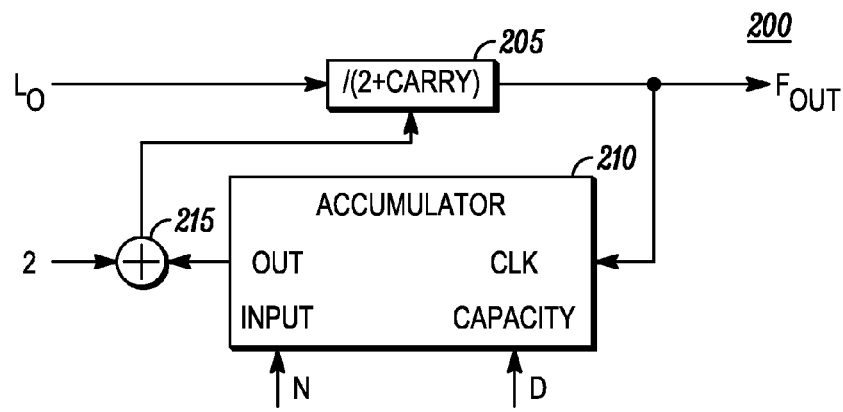
FIG. 2 is a schematic diagram of a digital circuit for implementing a fractional N synthesis based programmable frequency divider for the receiver of FIG. 1.

FIG. 2 illustrates a frequency offset circuit in more detail in which a controllable frequency divider is used within an N-fractional synthesis circuit for implementing the fractional division ratio in the programmable frequency divider 155 of FIG. 1. The N-fractional synthesis based frequency offset circuit 200 comprises a controllable frequency divider 205, an accumulator 210, and a summer or adder 215 with an input set to a binary value of 2. The controllable frequency divider 205 includes a control input to allow its division ratio to be controlled as will be appreciated by those skilled in the art. The controllable frequency divider receives a local oscillator signal (Lo) input from a VCO 145 of the two-way radio circuit 100, together with a control input from the summer 215 which sets the division ratio. The controllable frequency divider 205 divides the local oscillator signal (Lo) by the division ratio to generate an output signal $F_{out}$ which is used in the two-way radio circuit 100 as the offset signal or the carrier signal for the transmitter (185) depending on the division ratio and mode of the two-way radio circuit 100. The accumulator 210 receives the output signal $F_{out}$ at its clock (CLK) input, and outputs a Carry value from its Output. The Carry value is bit 1 or 0. The accumulator 210 receives a programmable numerator number N at its input from the controller 196 in order to implement the transmission or test modes; and a denominator number D at its Capacity Input. At the start of the cycle, the accumulator is set to the value of N. At the subsequent cycles, the accumulator is increased by N. A carry 1 is generated when the value of accumulator exceeds the denominator value of D. The value of the carry is added to divide by 2 at the instant. By time averaging, this circuit arrangement generates a $F_{out}=Lo/(2+N/2^D)$ as will be appreciated by those skilled in the art. Where N=1 and D=20, the fractional value is 0.000000954. Hence, a divide ratio of 2.00000954 can be generated. Various other N-fractional synthesis circuits could alternatively be used as would be appreciated by those skilled in the art.

Figure 3:
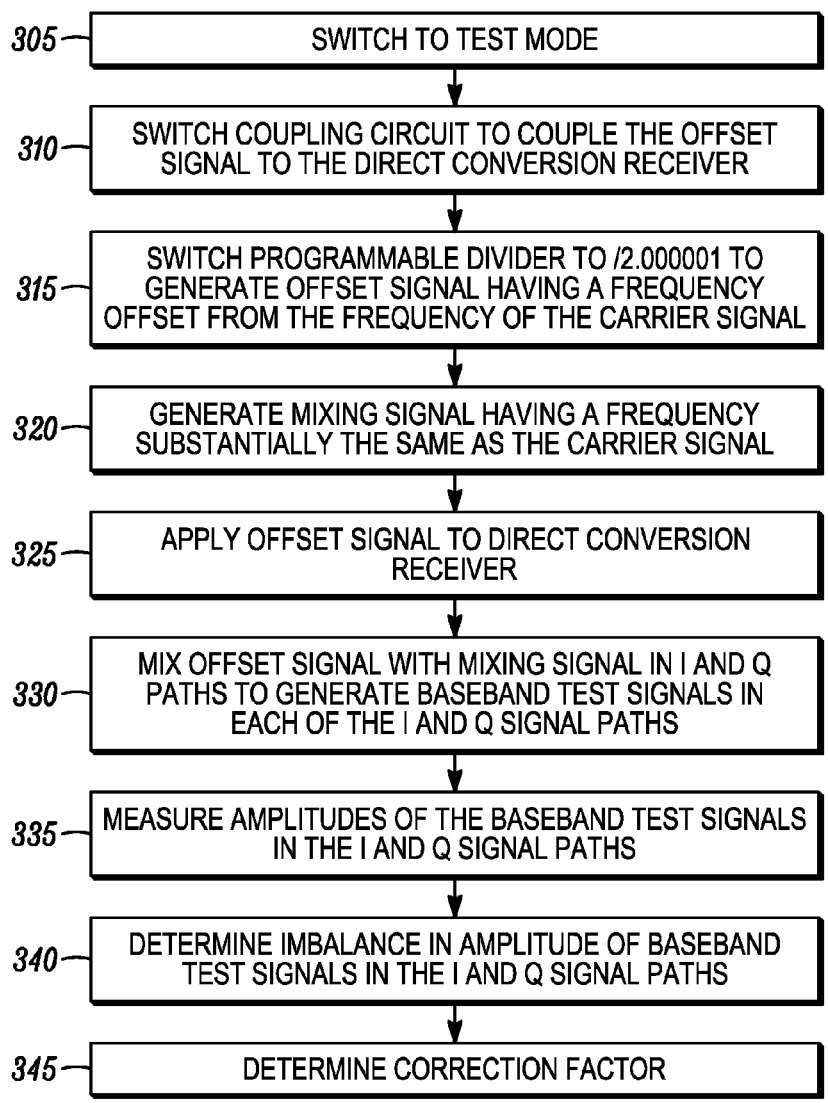
FIG. 3 is a flow chart illustrating a method of estimating an I/Q amplitude imbalance in the two-way radio circuit of FIG. 1.

FIG. 3 illustrates a method of estimating an imbalance between the amplitudes of an in-phase and a quadrature phase signal path in a direct conversion receiver 180 for receiving a carrier signal modulated by a data signal. The method 300 may be implemented using software executed on the controller 195. The method 300 initially receives an instruction to switch to test mode at step 305. This may be received from an operator of the two-way radio circuit 100, by an over-the-air command from a broadcast transmitter, periodically and/or as part of a power on routine. The method at step 310 switches the switches 170a, 170b, 170c so that the programmable frequency divider 155 is connected to the direct conversion receiver 180 of the two way radio circuit. The method then, at step 315, controls the programmable frequency divider 155 to switch from a transmission division ratio (e.g., 2) to an offset division ratio (e.g., 2.000001) in order to generate the offset signal having a frequency offset from the frequency of the carrier signal. At step 320, a mixing signal is generated for the direct conversion receiver 180 of the two-way radio circuit 100, the mixing signal having a frequency substantially the same as the carrier signal. The offset signal is applied, at step 325, to the direct conversion receiver 180. At step 330, the offset signal is then mixed with the mixing signal within the mixing module 125i,125q having I and Q signal paths in order to generate baseband test signals in respective in-phase (I) and quadrature phase (Q) signal paths. 120i, 120q. The amplitudes of the I and Q baseband test signals are then measured, at step 335, by the DSP 135. The method at step 340 then determines any imbalance or difference in amplitude between the measured amplitudes of the I and Q baseband test signals. A correction factor (e.g., Cq) is then determined within the DSP 135, at step 345, so that this I/Q imbalance can be corrected on subsequent received signals when the two way radio circuit is switched to a receiver mode.

Although the embodiments have been described with respect to certain structural arrangements, these have been used for clarity of explanation and it would be understood by those skilled in the art that alternative structures could be used. For example although a specific arrangement of switches 170a-170c has been described to implement the coupling circuit, any suitable matrix of switching elements could alternatively be used. For example, the output of the programmable frequency divider 155 could be switched directly to the input of the direct conversion receiver 180, rather than through intermediate switches (170a and 170b). In a further alternative, the arrangement of frequency dividers could be changed such that the mixing signal is provided directly to the mixers 125 and the input of the programmable frequency divider 155 from the VCO 145, there being no equivalent to the mixer frequency divider 150. In this case, the programmable frequency divider 155 will be programmed to switch between a division ratio of 1 and a fractional offset division ratio (e.g., 1.000001). In one other alternative embodiment, a divide by 4 function can be used by the mixer frequency divider 150 for and a divide by 4.00 or 4.000001 can be used by the programmable frequency divider 155.

Although the embodiments have been described with respect to two-way radio circuits and direct conversion receivers, various other circuits could benefit from these circuit arrangements and methods.

Figure 4A:
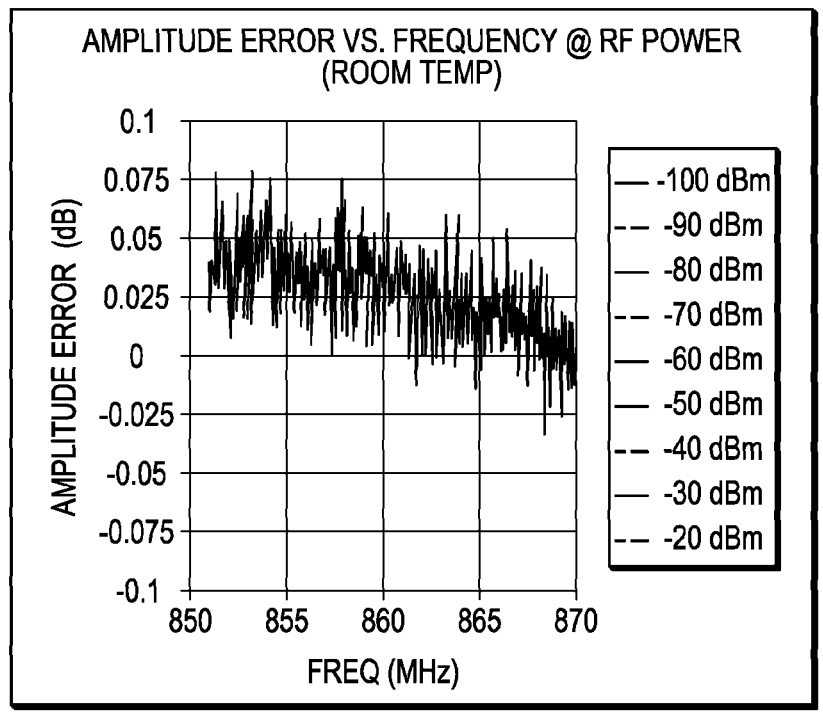
FIG. 4a, FIG. 4b.
Figure 4B:
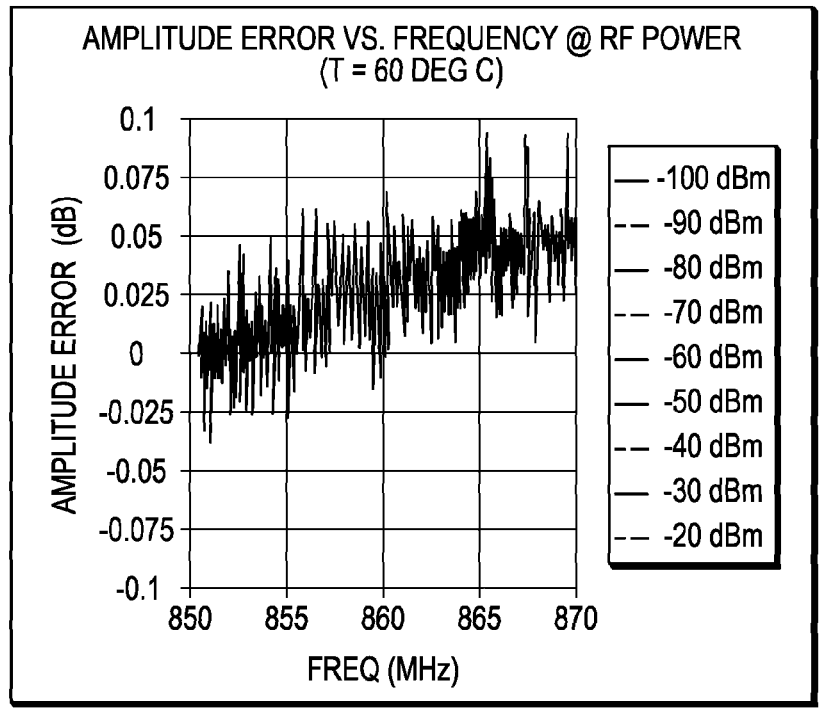
Figure 4C:
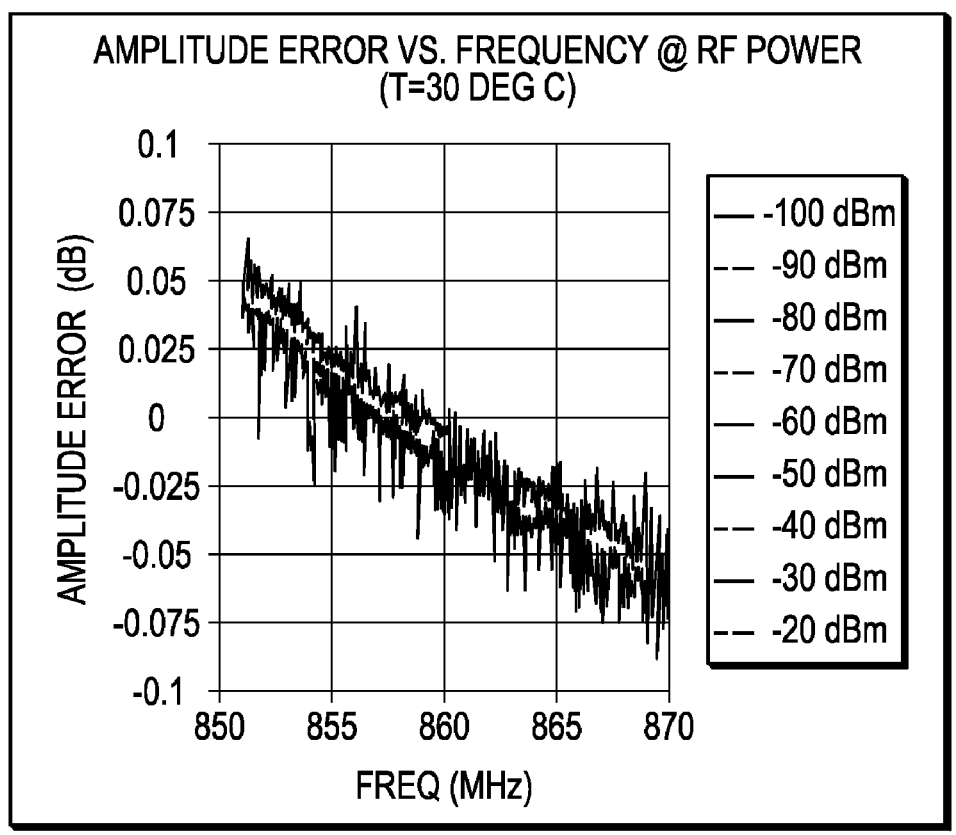
FIG. 4c. illustrate I/Q amplitude imbalances over different frequencies at different respective temperatures.

FIGS. 4a-c illustrate I/Q amplitude imbalances over different frequencies that would normally occur without correction, for example by the embodiments described above. FIG. 4a illustrates these imbalances at room temperature, FIG. 4b at 60 Celsius, and FIG. 4c at 30 Celsius. Thus, the present invention advantageously estimates such imbalances thereby providing for allowing correction thereof.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A circuit comprising:
    an antenna for receiving a carrier signal modulated by a data signal;
    a direct conversion receiver for receiving the modulated carrier signal, the direct conversion receiver including a mixing module having an in-phase and a quadrature phase signal path arranged to mix a mixing signal at different phases with the received modulated carrier signal in order to generate an in-phase and a quadrature baseband signal;
    a signal generator circuit arranged to generate the mixing signal having a frequency substantially the same as the carrier signal;
    a frequency offset circuit arranged to generate an offset signal having a frequency offset from the frequency of the carrier signal; and
    a coupling circuit arranged to selectively decouple the antenna from the direct conversion receiver and to couple the offset signal to the mixing module in order to generate a baseband test signal in the in-phase and quadrature signal paths for determining an imbalance in the amplitudes of the baseband test signals between the in-phase and quadrature signal paths,
    wherein the signal generator circuit comprises a first frequency divider coupled to an oscillator the frequency offset circuit comprises a programmable frequency divider coupled to the oscillator, the programmable frequency divider having a division ratio offset from the division ratio of the first frequency divider in order to generate the offset signal, and at least one of:

wherein the first frequency divider provides the mixing signal to a feedforward path of the direct conversion receiver but does not provide the mixing signal to a feedback path of the direct conversion receiver and the programmable frequency divider provides the offset signal to the feedback path but does not provide the offset signal to the feedforward path, or the frequency offset circuit further comprises a summer, the summer having an input set at a predetermined value and a smaller variable value, the division ratio of the programmable frequency divider being set by the sum of the predetermined value and the smaller variable value.

2. The circuit as claimed in claim 1, wherein the signal generator circuit is arranged to generate the mixing signal from a local oscillator signal, and the frequency offset circuit is arranged to adjust the frequency of the local oscillator signal to generate the offset signal.

3. The circuit as claimed in claim 1, further comprising a power amplifier selectively coupled by the coupling circuit to the frequency offset circuit, the frequency offset circuit being controllable to generate a transmission carrier signal when coupled to the power amplifier, the transmission carrier signal having a frequency substantially the same as the first carrier signal modulated by the data signal.

4. The circuit as claimed in claim 3, wherein the coupling circuit is arranged in the transmission mode to couple the programmable frequency divider to the power amplifier and the power amplifier to an antenna, and in a receiving mode the coupling circuit is arranged to couple the receiver to the antenna, and in a test mode the coupling circuit is arranged to couple the programmable frequency divider to the receiver and to decouple the power amplifier.

5. The circuit as claimed in claim 1, further comprising means for measuring the amplitudes of the baseband signals in each of the in-phase and quadrature signal paths, and means for correcting any measured imbalance in amplitudes of the respective baseband signals.

6. The circuit as claimed in claim 1, further comprising a controller controlling the coupling circuit and the frequency offset circuit, the controller controlling the frequency offset circuit such that in a test mode the division ratio of the programmable frequency divider is offset from the division ratio of the first frequency divider while in a transmission mode the division ratio of the programmable frequency divider and of the first frequency divider are the same.

7. The circuit as claimed in claim 1, wherein the frequency offset circuit comprises the summer.

8. The circuit as claimed in claim 7, wherein the frequency offset circuit further comprises an accumulator having an output connected with the summer to supply the smaller variable value to the summer.

9. The circuit as claimed in claim 8, wherein the accumulator outputs provides a carry value of 1 or 0 from the output of the accumulator, the accumulator having a first input connected with the controller to receive a programmable numerator number from the controller and a second input to which a denominator number is supplied, such that a time averaged output of the frequency offset circuit is the frequency of the carrier signal divided by the sum of the predetermined value with the programmable numerator number divided by the predetermined value to the power of the denominator number.

10. The circuit as claimed in claim 7, wherein the predetermined value is the inverse of the division ratio of the first frequency divider.

11. The circuit as claimed in claim 1, wherein the first frequency divider provides the mixing signal to the feedforward path of the direct conversion receiver but does not provide the mixing signal to a feedback path of the direct conversion receiver and the programmable frequency divider provides the offset signal to the feedback path but does not provide the offset signal to the feedforward path.

12. A circuit comprising:

an antenna for receiving a carrier signal modulated by a data signal a direct conversion receiver for receiving the modulated carrier signal, the direct conversion receiver including a mixing module having an in-phase and a quadrature phase signal path arranged to mix a mixing signal at different phases with the received modulated carrier signal in order to generate an in-phase and a quadrature baseband signal;

a signal generator circuit arranged to generate the mixing signal having a frequency substantially the same as the carrier signal, the signal generator circuit comprising a first frequency divider coupled to an oscillator and the frequency offset circuit comprises a programmable frequency divider coupled to the oscillator, the programmable frequency divider having a division ratio offset from the division ratio of the first frequency divider in order to generate the offset signal;

a frequency offset circuit arranged to generate an offset signal having a frequency offset from the frequency of the carrier signal;

a coupling circuit arranged to selectively decouple the antenna from the direct conversion receiver and to couple the offset signal to the mixing module in order to generate a baseband test signal in the in-phase and quadrature signal paths for determining an imbalance in the amplitudes of the baseband test signals between the in-phase and quadrature signal paths; and a controller controlling the coupling circuit and the frequency offset circuit, the controller controlling the frequency, offset circuit such that in a test mode the division ratio of the programmable frequency divider is offset from the division ratio of the first frequency divider while in a transmission mode the division ratio of the programmable frequency divider and of the first frequency divider are the same.

13. The circuit as claimed in claim 12, further comprising a power amplifier selectively coupled by the coupling circuit to the frequency offset circuit, the frequency offset circuit being controllable to generate a transmission carrier signal when coupled to the power amplifier, the transmission carrier signal having a frequency substantially the same as the first carrier signal modulated by the data signal.

14. The circuit as claimed in claim 13, wherein the coupling circuit is arranged in the transmission mode to couple the programmable frequency divider to the power amplifier and the power amplifier to an antenna, and in a receiving mode the coupling circuit is arranged to couple the receiver to the antenna, and in a test mode the coupling circuit is arranged to couple the programmable frequency divider to the receiver and to decouple the power amplifier.

15. The circuit as claimed in claim 12, further comprising means for measuring the amplitudes of the baseband signals in each of the in-phase and quadrature signal paths, and means for correcting any measured imbalance in amplitudes of the respective baseband signals.

16. The circuit as claimed in claim 12, wherein the frequency offset circuit further comprises a summer, the summer having an input set at a predetermined value and a smaller variable value, the division ratio of the programmable frequency divider being set by the sum of the predetermined value and the smaller variable value, and at least one of:
the predetermined value is the inverse of the division ratio of the first frequency divider, or
the frequency offset circuit further comprises an accumulator having an output connected with the summer to supply the smaller variable value to the summer.

17. The circuit as claimed in claim 16, wherein the accumulator outputs provides a carry value of 1 or 0 from the output of the accumulator, the accumulator having a first input connected with the controller to receive a programmable numerator number from the controller and a second input to which a denominator number is supplied, such that a time averaged output of the frequency offset circuit is the frequency of the carrier signal divided by the sum of the predetermined value with the programmable numerator number divided by the predetermined value to the power of the denominator number.

18. A circuit comprising:
an antenna for receiving a carrier signal modulated by a data signal;
a direct conversion receiver for receiving the modulated carrier signal, the direct conversion receiver including a mixing module having an in-phase and a quadrature phase signal path arranged to mix a mixing signal at different phases with the received modulated carrier signal in order to generate an in-phase and a quadrature baseband signal;
a signal generator circuit arranged to generate the mixing signal having a frequency substantially the same as the carrier signal;
a frequency offset circuit arranged to generate an offset signal having a frequency offset from the frequency of the carrier signal;
a coupling circuit arranged to selectively decouple the antenna from the direct conversion receiver and to couple the offset signal to the mixing module in order to generate a baseband test signal in the in-phase and quadrature signal paths for determining an imbalance in the amplitudes of the baseband test signals between the in-phase and quadrature signal paths, and a power amplifier selectively coupled by the coupling circuit to the frequency offset circuit, the frequency offset circuit being controllable to generate a transmission carrier signal when coupled to the power amplifier, the transmission carrier signal having a frequency substantially the same as the first carrier signal modulated by the data signal, wherein the signal generator circuit comprises a first frequency divider coupled to an oscillator and the frequency offset circuit comprises a programmable divider coupled to the oscillator, the programmable frequency divider having a division ratio offset from the division ratio of the first frequency divider in order to generate the offset signal, and wherein the coupling circuit is arranged in the transmission mode to couple the programmable frequency divider to the power amplifier and the power amplifier to an antenna, and in a receiving mode the coupling circuit is arranged to couple the receiver to the antenna, and in a test mode the coupling circuit is arranged to couple the programmable frequency divider to the receiver and to decouple the power amplifier.

19. The circuit as claimed in claim 18, wherein the frequency offset circuit further comprises a summer, the summer having an input set at a predetermined value and a smaller variable value, the division ratio of the programmable frequency divider being set by the sum of the predetermined value and the smaller variable value, and at least one of
the predetermined value is the inverse of the division ratio of the first frequency divider, or
the frequency offset circuit further comprises an accumulator having an output connected with the summer to supply the smaller variable value to the summer.

20. The circuit as claimed in claim 19, wherein the accumulator outputs provides a carry value of 1 or 0 from the output of the accumulator, the accumulator having a first input connected with the controller to receive a programmable numerator number from the controller and a second input to which a denominator number is supplied, such that a time averaged output of the frequency offset circuit is the frequency of the carrier signal divided by the sum of the predetermined value with the programmable numerator number divided by the predetermined value to the power of the denominator number.

* * * * *

UNITED STATES PATENT AND TRADEMARK OFFICE
CERTIFICATE OF CORRECTION

PATENT NO. : 7,860,196 B2
APPLICATION NO. : 11/621735
DATED : December 28, 2010
INVENTOR(S) : Cheah et al.

Page 1 of 1

It is certified that error appears in the above-identified patent and that said Letters Patent is hereby corrected as shown below:

In Column 2, Line 62, delete "(J)" and insert -- (I) --, therefor.

In Column 2, Line 65, delete "(J)" and insert -- (I) --, therefor.

In Column 3, Line 2, delete "(J)" and insert -- (I) --, therefor.

In Column 4, Line 11, delete "(J)" and insert -- (I) --, therefor.

In Column 8, Line 67, in Claim 1, delete "oscillator" and insert -- oscillator and --, therefor.

In Column 12, Line 30, in Claim 19, delete "one of" and insert -- one of: --, therefor.

Signed and Sealed this
Thirty-first Day of July, 2012

David J. Kappos
*Director of the United States Patent and Trademark Office*